US008805009B1

(12) United States Patent
Daliyot et al.

(10) Patent No.: US 8,805,009 B1
(45) Date of Patent: Aug. 12, 2014

(54) TRAJECTORY MATCHING ACROSS DISJOINTED VIDEO VIEWS

(75) Inventors: Shahar Daliyot, Rehovot (IL); Gadi Zimerman, Hod-Hasharon (IL); Shmuel Kiro, Rehovot (IL); Oren Golan, Or-Yehuda (IL)

(73) Assignee: Verint Systems Inc., Santa Clara, CA (US)

( * ) Notice: Subject to any disclaimer, the term of this patent is extended or adjusted under 35 U.S.C. 154(b) by 166 days.

(21) Appl. No.: 13/351,493

(22) Filed: Jan. 17, 2012

(51) Int. Cl.
*G06K 9/00* (2006.01)
(52) U.S. Cl.
USPC .......................................................... 382/103
(58) Field of Classification Search
USPC .......... 382/100–107; 348/154–156, 169–171; 356/27–30
See application file for complete search history.

(56) References Cited

U.S. PATENT DOCUMENTS 7,714,261 B2 *  5/2010  Bnayahu et al. ............ 250/203.6
2012/0133778 A1 *  5/2012  Shih et al. .................... 348/169

* cited by examiner

*Primary Examiner* — Atiba O Fitzpatrick
(74) *Attorney, Agent, or Firm* — Meunier Carlin & Curfman

(57) ABSTRACT

Embodiments disclosed herein provide systems and methods for matching trajectories across disjointed video views. In a particular embodiment, a method provides identifying a first trajectory associated with an object in video captured of a first region. The method further provides identifying a plurality of alternative views of the object from the video of the first region. The method further provides using the plurality of alternative views of the object, selecting a second trajectory that corresponds to the first trajectory from a plurality of trajectories associated with a plurality of objects in video captured of a second region.

18 Claims, 6 Drawing Sheets

TRAJECTORY MATCHING ACROSS DISJOINTED VIDEO VIEWS

TECHNICAL BACKGROUND

A video capture system, such as a video surveillance system, may include and receive video from multiple video capture sources, such as video cameras. These video cameras may be placed at various indoor or outdoor locations for monitoring various areas of interest. The video cameras are thereby able to also capture objects, such as people, animals, vehicles, or other items, that move through and within each region that is captured by each video camera.

A processing system of the video capture system may be able to recognize the objects that are captured by the video cameras. Moreover, the processing system may further be able track the movement of an object in a single captured region from one of the video cameras. However, the ability to track movement of the object in a single view does not further allow the processing system to track movement of the object if the object crosses multiple views that correspond to the multiple video cameras that capture video for the video processing system.

OVERVIEW

Embodiments disclosed herein provide systems and methods for matching trajectories across disjointed video views. In a particular embodiment, a method provides identifying a first trajectory associated with an object in video captured of a first region. The method further provides identifying a plurality of alternative views of the object from the video of the first region. The method further provides using the plurality of alternative views of the object, selecting a second trajectory that corresponds to the first trajectory from a plurality of trajectories associated with a plurality of objects in video captured of a second region.

In some embodiments the method further provides generating a composite trajectory for the object based on the first trajectory and the second trajectory.

In some embodiments the method provides that using the plurality of alternative views of the object comprises generating a first signature for the first trajectory from the plurality of alternative views of the object and selecting the second trajectory comprises comparing the first signature to a plurality of signatures for the plurality of trajectories to find a second signature for the second trajectory from the plurality of signatures that satisfies a comparison criteria.

In some embodiments the criteria is satisfied if the first signature and the second signature are matching to within a threshold amount of deviation.

In some embodiments the plurality of alternative views of the object do not include views that provide information about the object that is redundant to at least one view already included in the plurality of alternative views.

In some embodiments the method further provides identifying a plurality of alternative views of each object of the plurality of objects in the video captured of the second region and generating each signature of the plurality of signatures from each of the plurality of alternative views of each object of the plurality of objects.

In some embodiments the method provides that each view of the plurality of alternative views of the object comprises a representation of the object in a frame of the video captured of the first region and each view of the plurality of alternative views of each object of the plurality of objects comprises a representation of each object of the plurality of objects in a frame of the video captured of the second region.

In a further embodiment a video processing system is provided. The video processing system includes a video interface configured to receive video captured of a first region and video captured of a second region. The video processing system further includes a processor system configured to identify a first trajectory associated with an object in the video captured of the first region and identify a plurality of alternative views of the object from the video of the first region. The processor system is further configured to use the plurality of alternative views of the object to select a second trajectory that corresponds to the first trajectory from a plurality of trajectories associated with a plurality of objects in the video captured of the second region.

A further embodiment provides a computer readable medium having instructions stored thereon for operating a video processing system, wherein the instructions, when executed by the video processing system, direct the video processing system to identify a first trajectory associated with an object in video captured of a first region and identify a plurality of alternative views of the object from the video of the first region. The instructions further direct the video processing system to use the plurality of alternative views of the object to select a second trajectory that corresponds to the first trajectory from a plurality of trajectories associated with a plurality of objects in video captured of a second region.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
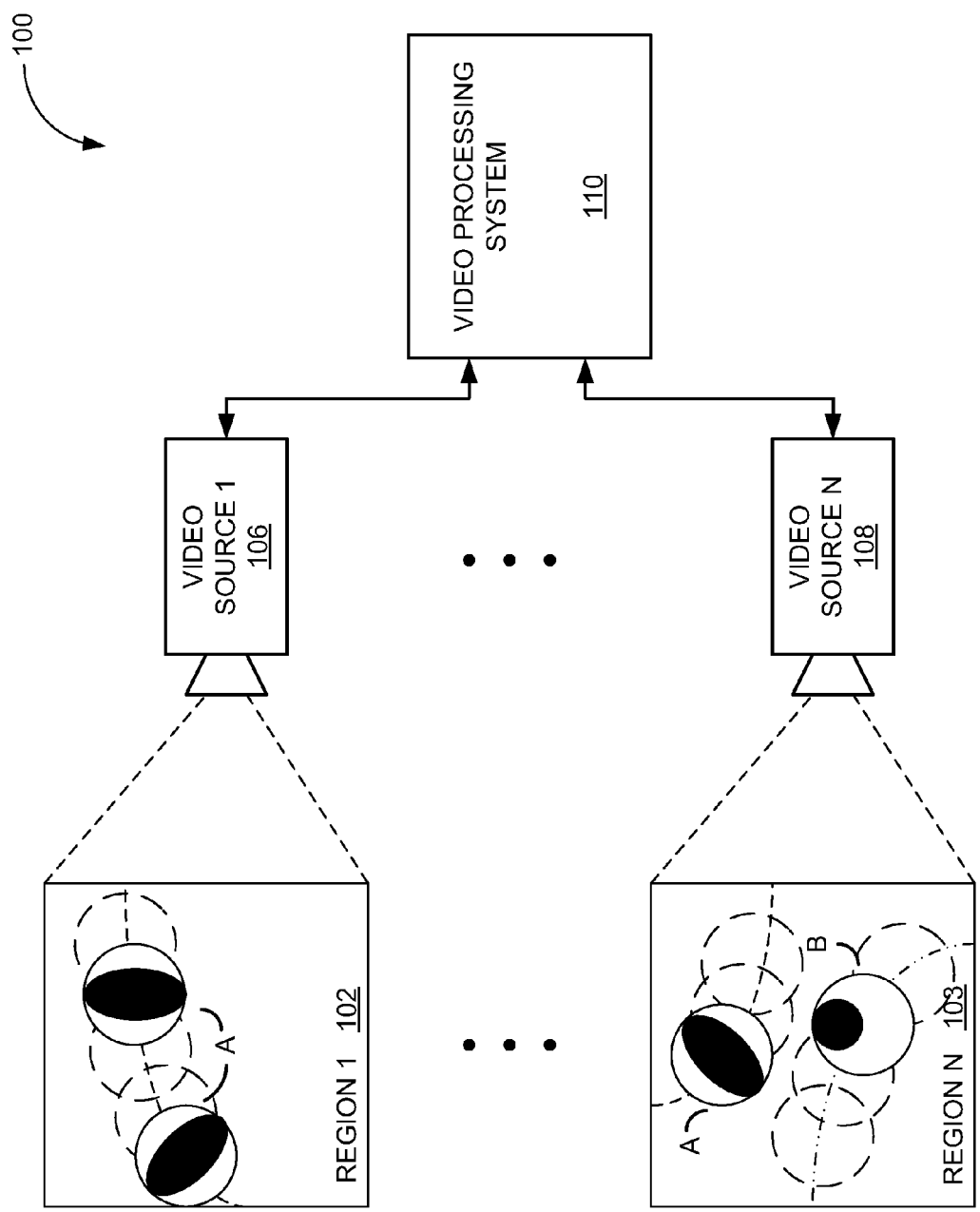
FIG. 1 illustrates a video system for matching trajectories across disjointed video views.

FIG. 1 illustrates a block diagram of an example of a video system 100 for matching trajectories across disjointed video views. Video system 100 includes video source 1 106, video source N 108, video processing system 110, and video storage system 112. Video source 1 106 is configured to capture video of region 1 102, while video source N 108 is configured to capture video of region N 104. Video source 1 106 and video source N 108 are coupled to video processing system 110.

In operation, video system 100 may be a video surveillance system or any other type of video capture system. Video system 100 captures video of regions 1–N from video sources 1–N, respectively. Regions 1–N may comprise various areas of interest to video capture system 100. The areas may be indoor, outdoor, or some combination thereof. The video is transferred from video sources 1–N to video processing system 110. Video processing system 110 is capable of identifying objects that are shown in the video captured of regions 1–N. Region 1 and region N may be overlapping, partially overlapping, abutting, or separate regions. Thus, the states of regions 1 and N as they are shown in FIG. 1 may not be contemporaneous since object A may be shown in both region 1 and region N at the same time if the regions overlap or object A may enter region N at some point after leaving region 1. Object A may be anything that can move on a trajectory through a video scene including a person, animal, vehicle, or some type of inanimate object.

Figure 2:
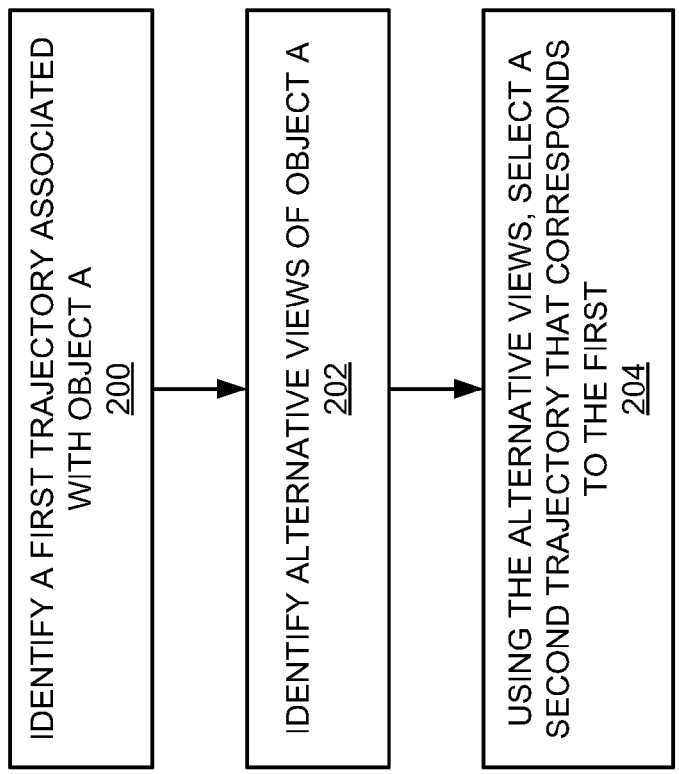
FIG. 2 illustrates the operation of a video system for matching trajectories across disjointed video views.

FIG. 2 illustrates the operation of video system 100 for matching trajectories across disjointed video views. Video source 1 captures video of region 1. The video includes any objects that may be located or passing through region 1, such as object A as shown in FIG. 1. Video source 1 transfers the video of region 1 to video processing system 110. The video may be transferred in real time for processing by video processing system 110, may be stored in video source 1 for transferring and processing at a later time, may be stored within processing system 110 for processing at a later time, or may be transferred to an unpictured video storage system for processing at a later time.

Upon receiving the video of region 1, video processing system 110 identifies a first trajectory associated with object A in the video captured of region 1 (step 200). The trajectory may be identified by processing system 110 tracking the movement of object A as it crosses through region 1 as the video of region 1 elapses. The trajectory of object A is represented by the dashed arc in region 1 but may take any path through or within region 1. Video processing system 110 may use various known forms of object detection in order to recognize object A within frames of the video in order to piece together the trajectory of object A in the video.

Additionally, video processing system 110 identifies a plurality of alternative views of object A from the video of region 1 (step 202). The alternative views provide further information about object A. As object A progresses along its trajectory in region 1, video source 1 may capture different views of object A caused both by movement of object A itself and positioning of video source 1. FIG. 1 highlights two exemplary views of object A that video source 101 may capture as object A passes through Region 1. For example, if video source 1 is a fixed position video camera and object A crosses region 1 perpendicularly to the view of video source 1, then video source 1 will be able to capture the front of object A as object A moves towards the location of video source 1, the side of object A as object A is directly in front of video source 1, and the back of object A as object A moves away from the location of video source 1 along with any angle of object A that occurs in between. Likewise, video source 1 will capture even further views of object A if object A repositions itself as object A moves along the trajectory. For example, if object A is a person, then the person may possibly turn around or turn his or her head while following the trajectory through region 1. Video processing system 110 is thereby able to identify additional views of the person from these motions.

Each view of the alternative views that are identified by video processing system 110 may be identified by processing the video of region 1 on a frame-by-frame basis to obtain information about a view of object A. In some embodiments, video processing system 110 may discard information about a view of object A that is repetitive. For example, object A may not change position enough from one frame to the next in order for the view of object A in the subsequent frame to be considered appreciatively different from the view of object A in the previous frame. Video processing system 110 may maintain a threshold value of change that information in a view of object A should surpass in order for that view to not be discarded. For example, if object A moves through region 1 at a rate significantly slower than the frame rate for the video, then the view of object A may not change in any significant way for multiple frames. Consequently, some intervening frames will be discarded by video processing system 110 because the intervening frames provide redundant information about a view of object A.

In view of the preceding example, some embodiments may only process a subset of the total frames of the video. Each frame of the subset of frames is spaced far enough apart in time to decrease the likelihood of adjoining frames in the subset having redundant view information about object A. Each frame of the subset of frames may still be processed to determine whether the frame should be discarded based on redundant view information contained within each frame. Alternatively, video processing system 110 may operate under the assumption that the frames are spaced far enough apart so as to render negligible any redundant view information that happens to still exist in the subset of frames.

After identifying the plurality of alternative views for object A, video processing system 110 uses the plurality of alternative views of object A to select a second trajectory of object A that corresponds to the first trajectory of object A from a plurality of trajectories associated with objects in video captured of region N (step 204). Video processing system 110 may identify the plurality of trajectories of objects in region N in the same manner described above for the trajectory of object A in region 1 by identifying alternative views for objects shown in region N. Specifically, video processing system 110 identifies the trajectories of objects A and B in region N.

Video processing system 110 performs a comparison between the trajectory determined for object A in region 1 with the trajectories determined for objects A and B in region N. The results of the comparison indicates to video processing system 110 that object A in region 1 is the same object as object A in region N and that the trajectory of object A in region 1 and the trajectory of object A in region N are part of a larger trajectory that spans at least region 1 and region N. The comparison uses the alternative views that are identified for object A in both region 1 and N to determine that object A is the same object in both regions. In other words, at least a portion of the alternative views identified for object A in region 1 will match, or closely match, a portion of the alternative views identified for object A in region N.

In contrast, a comparison of the alternative views identified for object B in region N with the alternative views identified for object A in region 1 will indicate that object B in region N is not the same object as object A in region 1.

Video processing system 110 may use various criteria to determine that the alternative views for object A in regions 1 and N comprise views of the same object. For example, video processing system 110 may maintain that a threshold number of alternative views captured of an object in two different regions should match in order for video processing system 110 to recognize the object as being the same object. Additionally, video processing system 110 may use image recognition processing when determining whether two individual alternative views match one another.

In some embodiments, video processing system 110 may receive and process video transferred from additional video sources that make up video sources 1–N. Similarly, video of each region 1–N that is captured by video sources 1–N may show more objects than the two objects A and B shown in FIG. 1. Thus, video processing system 110 may compare alternative views of many different objects captured from many different regions in order to identify matching trajectories for those objects across the regions.

Once video processing system 110 has identified that object A is the same object in both region 1 and N, video processing system 110 may be able to generate an composite trajectory for object A that includes the trajectories determined for object A in regions 1 and N. The composite trajectory may be generated using knowledge of the physical locations that are captured in regions 1 and N. For example, if video processing system 110 knows where regions 1 and N are located relative to each other and the direction in which video sources 1 and N are pointed, then video processing system 110 may be able to combine the trajectory of object A in region 1 with the trajectory of object A in region N to create a composite trajectory for object A. Additionally, the composite trajectory may include an estimation of a trajectory for object A in regions that are not covered by a video source.

Advantageously, the above embodiment allows for the generation of a composite trajectory for an object that is captured using views of the object captured by multiple disjointed video sources.

In some embodiments, video processing system 110 may display a graphical representation of the trajectory of object A. For example, video processing system 110 may display or transfer to another system for display of a map of the area captured by video sources 1–N with the trajectory of object A superimposed over the map. Alternatively, video processing system 110 may store the trajectory with or without the video captured of object A for later display or other type of dissemination.

Referring back to FIG. 1, video sources 106 and 108 comprise components capable of capturing video images of a scene. The components typically include a lens, image sensor, and a processor for interpreting the information received by the image sensor. Video sources 106 and 108 may each also include a user interface, memory device, software, processing circuitry, or some other components necessary for video sources 106 and 108 to operate as described herein. Video sources 106 and 108 may each be a video camera, a computer web cam, a digital camera, or some other device capable of capturing video images—including combinations thereof.

Video processing system 110 comprises a computer system, a video interface, and a communication interface. Processing system 110 may also include other components such a router, server, data storage system, and power supply. Processing system 110 may reside in a single device or may be distributed across multiple devices. Processing system 110 is shown externally to video sources 106 and 108, but system 110 could be integrated within the components of either or both of video sources 106 and 108. Processing system 110 could be a multipurpose workstation, dedicated computer system, application server, or any other type of processing system—including combinations thereof.

Communication links between the above elements use metal, glass, air, space, or some other material as the transport media. The communication links could use various communication protocols, such as Time Division Multiplex (TDM), Internet Protocol (IP), Ethernet, communication signaling, Universal Serial Bus (USB), Firewire, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. The communication links could be direct links or may include intermediate networks, systems, or devices.

Figure 3:
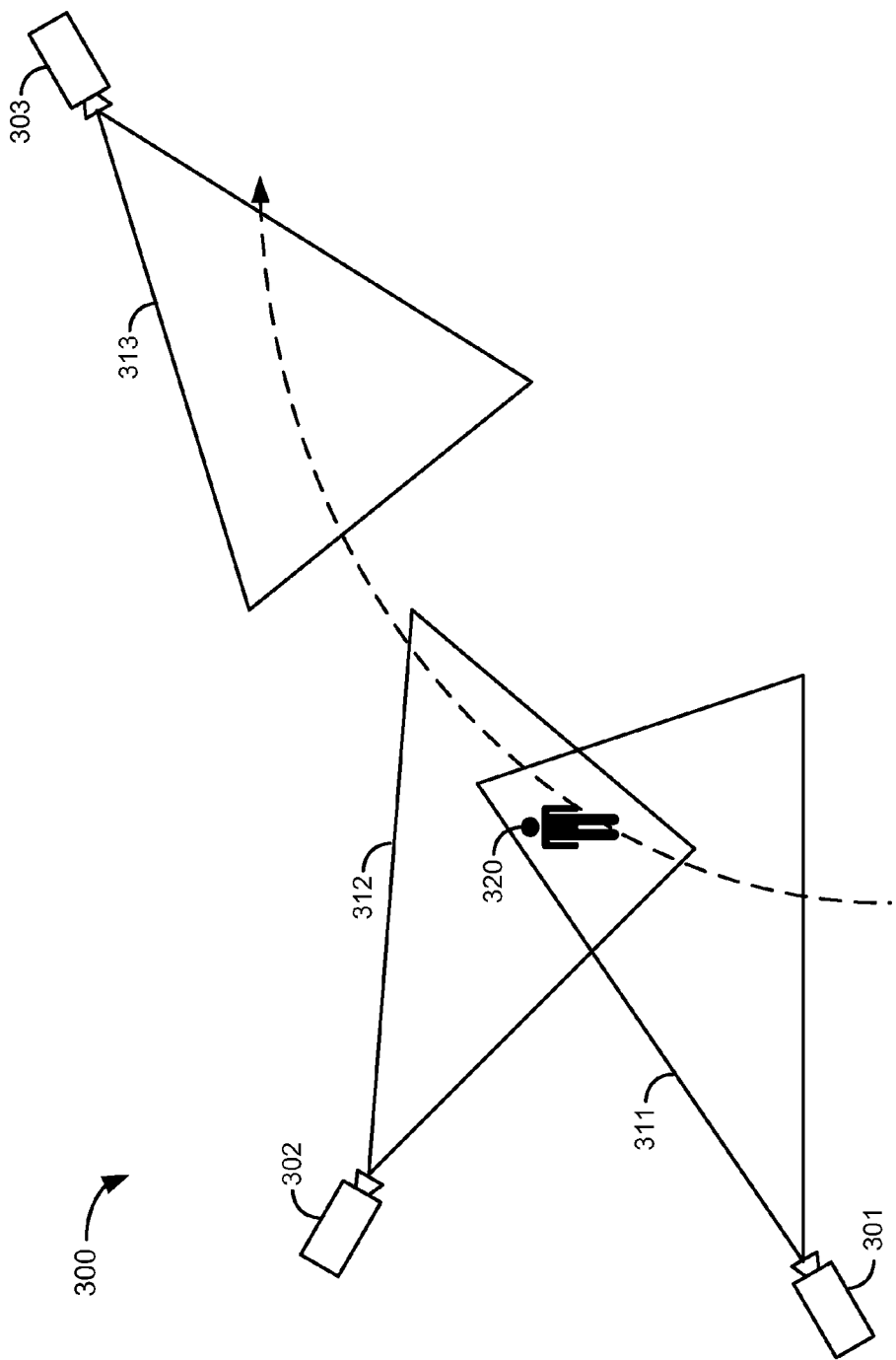
FIG. 3 illustrates a video system for matching trajectories across disjointed video views.

FIG. 3 illustrates a block diagram of video system 300 for matching trajectories across disjointed video views. Video system 300 includes video cameras 301-303. Video cameras 301-303 capture regions 311-313, respectively. Regions 311-313 are shown as triangular two-dimensional top down representations of the area that is captured by video cameras 301-303 but regions 311-313 may take any other shape. FIG. 3 further includes person 320 who moves through regions 311-313 along a trajectory represented by the dashed arc.

In operation, video cameras 301-303 capture video of regions 311-313. Video cameras 301-303 then transfer the captured video to video processing system 110, which identifies trajectories for objects that move within and through regions 311-313.

Figure 4:
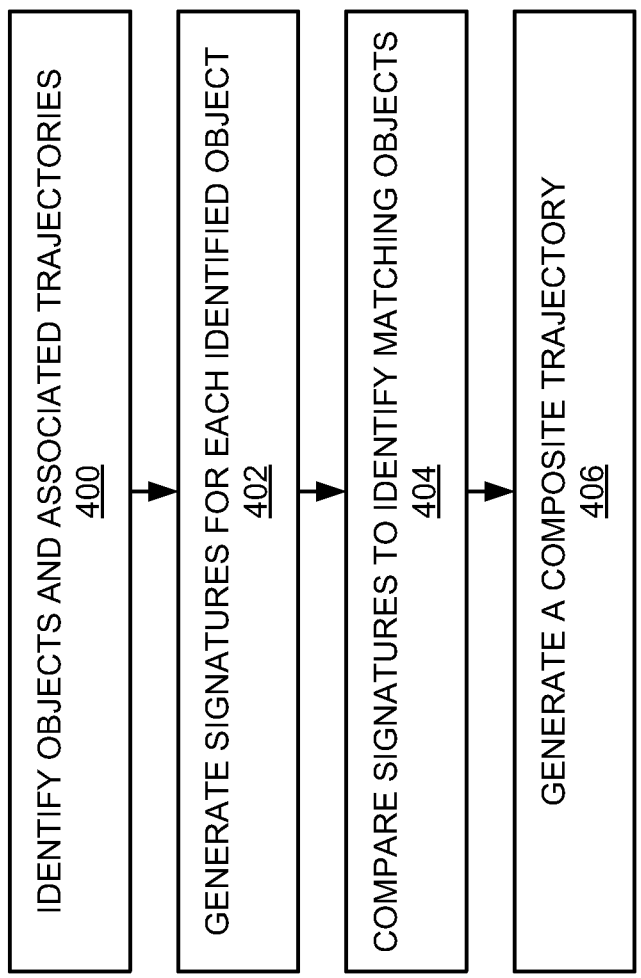
FIG. 4 illustrates the operation of a video system for matching trajectories across disjointed video views.

FIG. 4 illustrates the operation of video system 300 for matching trajectories across disjointed video views. In operation, video cameras 301-303 continuously capture video of regions 311-313 and transfer the video to the video processing system 110. Video processing system 110 identifies objects in the video and determines trajectories associated with the identified objects (step 400). While only person 320 is shown in FIG. 3 as passing through regions 311-313, it should be understood that during other time periods other objects, including multiple objects, may pass through regions 311-313 for recognition by video processing system 110.

In this example, video processing system 110 identifies person 320 as an object in the video of each region 311-313. Additionally, video processing system 110 associates person 320 with a portion of the dashed line representing the trajectory of person 320 in each of regions 311-313, respectively. Thus, at this stage in the processing, video processing system 110 has merely recognized that an object has passed through each of regions 311-313 and has not yet recognized that the object is the same person 320.

Either after or concurrent to identifying objects and associated trajectories, video processing system generates a signature for each object (step 402). A signature is derived from models of the object with each model corresponding to a view of the object in a video frame. The information that composes a model is an estimation of how the object would look from a particular view point. The information may be derived from various algorithms that are used for image matching or may be a portion of the video frame itself that shows the object in the particular view point.

In this example, three signatures are created for person 320. One signature is completed for the trajectory of person 320 in region 311, a second signature is created for the trajectory of person 320 in region 312, and a third signature is created for the trajectory of person 320 in region 313. In some embodiments, video processing system 110 may be aware of the overlap between regions 311 and 312. Consequently, video processing system 110 may be able to recognize that an object identified in the overlapping area is the same object without the need for further object recognition. The signature for person 320 in either or both of regions 311 and 312 may therefore be enhanced with additional views for person 320 from the other region.

Figure 5:
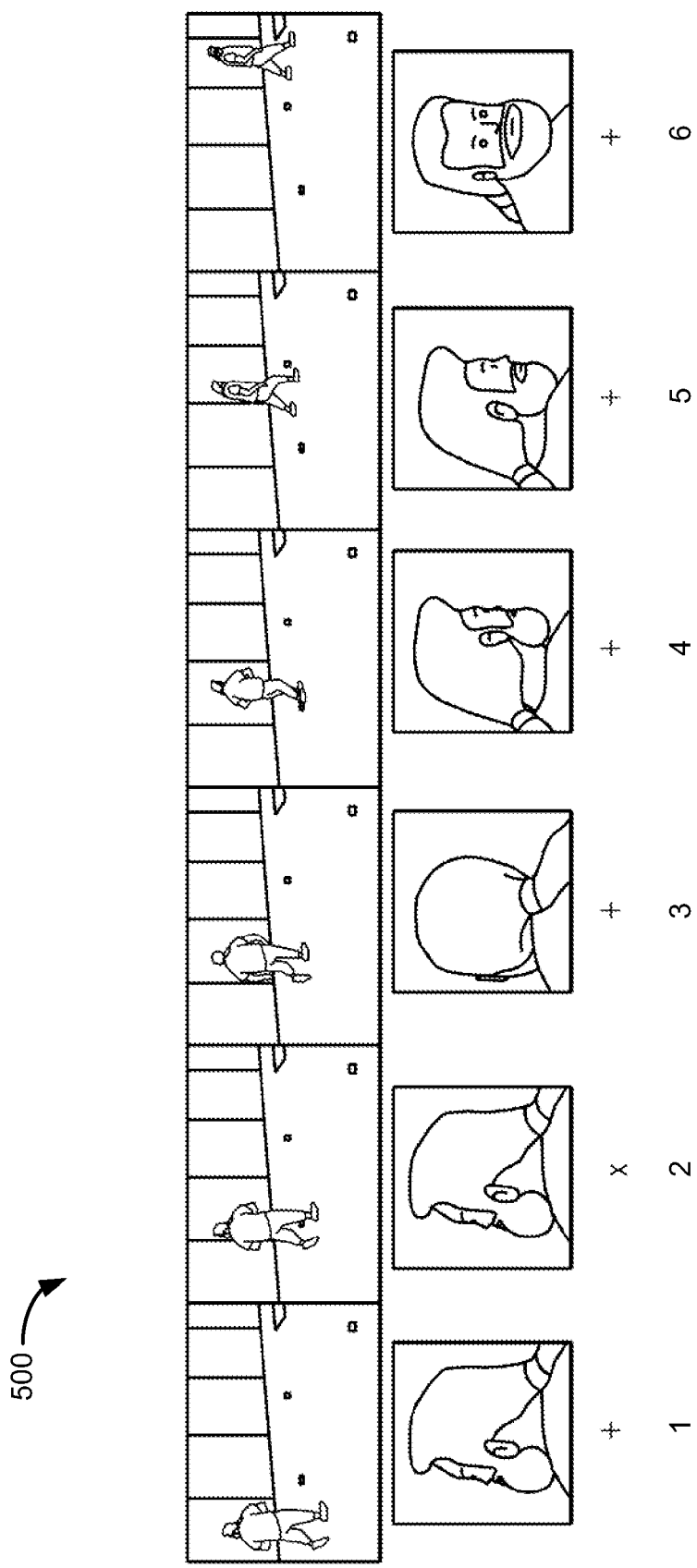
FIG. 5 illustrates a video frame set for matching trajectories across disjointed video views.

FIG. 5 illustrates frame set 500 in an example of person 320 walking on a trajectory through one of regions 311-313. Specifically, frame set 500 displays video frames 1-6, which may be all or merely an exemplary subset of the total frames processed for the region. While frames 1-6 show the entire body of person 320, video processing system 110 in this example is only concerned with the head of person 320 when creating a signature of person 320. Other embodiments may consider a larger portion of the body of person 320. Moreover, when video processing system 110 creates a signature for person 320, video processing system 110 only creates models for use in the signature that provide additional information about the head of person 320. Therefore, since frame 2 shows the head of person 320 in a position similar to that of frame 1, frame 2 does not provide information additional to the information already provided by frame 1 and a model is not created using frame 2. Accordingly, a signature for person 320 in this example region is created using models derived from video frames 1 and 3-6.

Referring back to FIG. 4, once video processing system 110 has generated a signature for person 320 in each of regions 311-313, video processing system 110 compares the signatures to determine whether person 320 in the video of each region matches person 320 in the other regions (step 404). Two signatures are compared by comparing all models that comprise one signature to all models that comprise the other signature. The results of these individual model comparisons are aggregated and, if the aggregated comparisons are within a threshold range of similarity, then the signatures are considered signatures for the same object.

In the example of FIG. 3, the comparison of signatures for person 320 in regions 311-313 will result in video processing system 110 determining that person 320 is the same person across each of regions 311-313. In contrast, if another person walks through region 313 at any time, then video processing system 110 will create and compare a signature for that person to the signature of person 320 from regions 311 and 312 to determine that the other person is not the same as person 320.

In some embodiments, once two signatures are considered to be equivalent, the two signatures may be combined in such a way as to create a more precise signature that contains models of person 320 that contain information previously exclusive to one of the signatures. For example, if a second signature contains models of person 320 that contain information about the left side of person 320 and the first signature only has models with information about the right side of person 320, then the right side models of the second signature may be integrated into the first signature to create a more complete signature of person 320 for use in further signature comparisons.

After determining that person 320 is the same object in each region 311-313, video processing system 110 can create a composite trajectory for person 320 that spans the three regions 311-313 (step 406). Furthermore, when creating the composite trajectory, video processing system 110 may also estimate the trajectory of person 320 when person 320 is not located in one of regions 311-313, such as is the case in the space between region 312 and 313. Thus, even if the trajectory of an object is not able to be captured by at least one video camera for the entirety of its trajectory, video processing system 110 is still able to track the trajectory of the object across the gaps in regions of video coverage.

Figure 6:
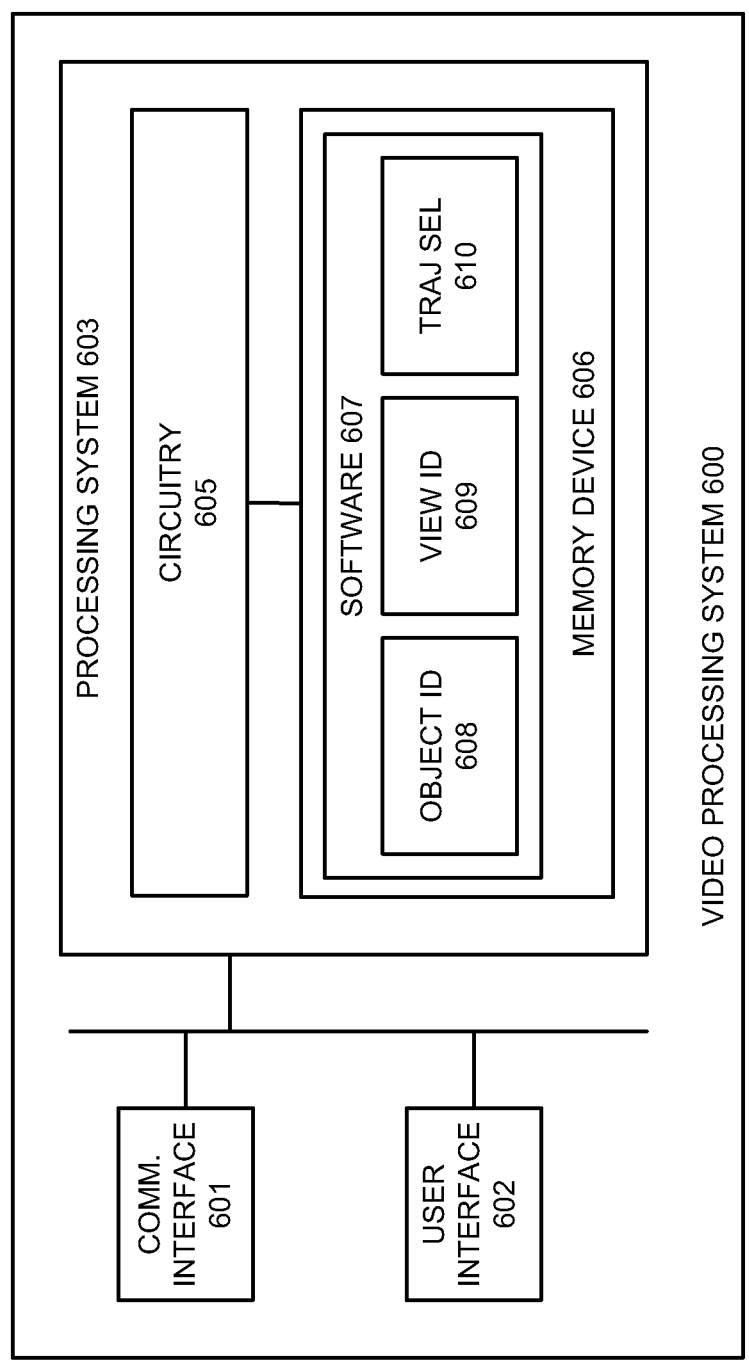
FIG. 6 illustrates a video processing system for matching trajectories across disjointed video views.

FIG. 6 illustrates video processing system 600. Video processing system 600 is an example of video processing system 110, although control system 110 may use alternative configurations. Video processing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software includes object identification module 608, view identification module 609, and trajectory selection module 610. Operating software 607 may further include an operating system, utilities, drivers, network interfaces, applications, or some other type of software. When executed by circuitry 605, operating software 607 directs processing system 603 to operate video processing system 600 as described herein.

In particular, object identification module 608 directs processing system 603 to identify a first trajectory associated with an object in video captured of a first region. View identification module 609 directs processing system 603 to identify a plurality of alternative views of the object from the video of the first region. Trajectory selection module 610 directs processing system 603 to use the plurality of alternative views of the object, selecting a second trajectory that corresponds to the first trajectory from a plurality of trajectories associated with a plurality of objects in video captured of a second region.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video processing system, comprising:
   identifying a first trajectory associated with an object in video captured of a first region;
   identifying a plurality of alternative views of the object from the video of the first region; and
   using the plurality of alternative views of the object, selecting a second trajectory that corresponds to the first trajectory from a plurality of trajectories associated with a plurality of objects in video captured of a second region;
   wherein a video processing system maintains a threshold value of change that information in a view of the object should surpass in order for that view to not be discarded by the video processing system because it provides redundant information.

2. The method of claim 1, further comprising:
generating a composite trajectory for the object based on the first trajectory and the second trajectory.

3. The method of claim 1, wherein:
using the plurality of alternative views of the object comprises generating a first signature for the first trajectory from the plurality of alternative views of the object; and
selecting the second trajectory comprises comparing the first signature to a plurality of signatures for the plurality of trajectories to find a second signature for the second trajectory from the plurality of signatures that satisfies a comparison criteria.

4. The method of claim 3, wherein the criteria is satisfied if the first signature and the second signature are matching to within a threshold amount of deviation.

5. The method of claim 3, further comprising:
identifying a plurality of alternative views of each object of the plurality of objects in the video captured of the second region; and
generating each signature of the plurality of signatures from each of the plurality of alternative views of each object of the plurality of objects.

6. The method of claim 3, wherein:
each view of the plurality of alternative views of the object comprises a representation of the object in a frame of the video captured of the first region; and
each view of the plurality of alternative views of each object of the plurality of objects comprises a representation of each object of the plurality of objects in a frame of the video captured of the second region.

7. A video processing system, comprising:
a video interface configured to receive video captured of a first region and video captured of a second region;
a processor system configured to identify a first trajectory associated with an object in the video captured of the first region, identify a plurality of alternative views of the object from the video of the first region, and use the plurality of alternative views of the object to select a second trajectory that corresponds to the first trajectory from a plurality of trajectories associated with a plurality of objects in the video captured of the second region; wherein a video processing system maintains a threshold value of change that information in a view of the object should surpass in order for that view to not be discarded by the video processing system because it provides redundant information.

8. The video processing system of claim 7, further comprising:
the processor system configured to generate a composite trajectory for the object based on the first trajectory and the second trajectory.

9. The video processing system of claim 7, wherein:
the processor system is configured to use the plurality of alternative views of the object to select the second trajectory by generating a first signature for the first trajectory from the plurality of alternative views of the object and comparing the first signature to a plurality of signatures for the plurality of trajectories to find a second signature for the second trajectory from the plurality of signatures that satisfies a comparison criteria.

10. The video processing system of claim 9, wherein the criteria is satisfied if the first signature and the second signature are matching to within a threshold amount of deviation.

11. The video processing system of claim 9, further comprising:
the processor system configured to identify a plurality of alternative views of each object of the plurality of objects in the video captured of the second region and generate each signature of the plurality of signatures from each of the plurality of alternative views of each object of the plurality of objects.

12. The video processing system of claim 9, wherein:
each view of the plurality of alternative views of the object comprises a representation of the object in a frame of the video captured of the first region; and
each view of the plurality of alternative views of each object of the plurality of objects comprises a representation of each object of the plurality of objects in a frame of the video captured of the second region.

13. A non-transitory computer readable medium having instructions stored thereon for operating a video processing system, wherein the instructions, when executed by the video processing system, direct the video processing system to:
identify a first trajectory associated with an object in video captured of a first region;
identify a plurality of alternative views of the object from the video of the first region; and
use the plurality of alternative views of the object to select a second trajectory that corresponds to the first trajectory from a plurality of trajectories associated with a plurality of objects in video captured of a second region; wherein the video processing system maintains a threshold value of change that information in a view of the object should surpass in order for that view to not be discarded by the video processing system because it provides redundant information.

14. The computer readable medium of claim 13, wherein the instructions further direct the video processing system to:
generate a composite trajectory for the object based on the first trajectory and the second trajectory.

15. The computer readable medium of claim 13, wherein the instructions direct the video processing system to use the plurality of alternative views of the object to select the second trajectory by generating a first signature for the first trajectory from the plurality of alternative views of the object and comparing the first signature to a plurality of signatures for the plurality of trajectories to find a second signature for the second trajectory from the plurality of signatures that satisfies a comparison criteria.

16. The computer readable medium of claim 15, wherein the criteria is satisfied if the first signature and the second signature are matching to within a threshold amount of deviation.

17. The computer readable medium of claim 15, wherein the instructions further direct the video processing system to:
identify a plurality of alternative views of each object of the plurality of objects in the video captured of the second region; and
generate each signature of the plurality of signatures from each of the plurality of alternative views of each object of the plurality of objects.

18. The computer readable medium of claim 15, wherein:
each view of the plurality of alternative views of the object comprises a representation of the object in a frame of the video captured of the first region; and
each view of the plurality of alternative views of each object of the plurality of objects comprises a representation of each object of the plurality of objects in a frame of the video captured of the second region.

* * * * *